Aug. 10, 1965     E. F. HAMILTON     3,199,893
ADJUSTABLE FOOT REST FOR A STROLLER
Original Filed Jan. 13, 1960     2 Sheets-Sheet 1
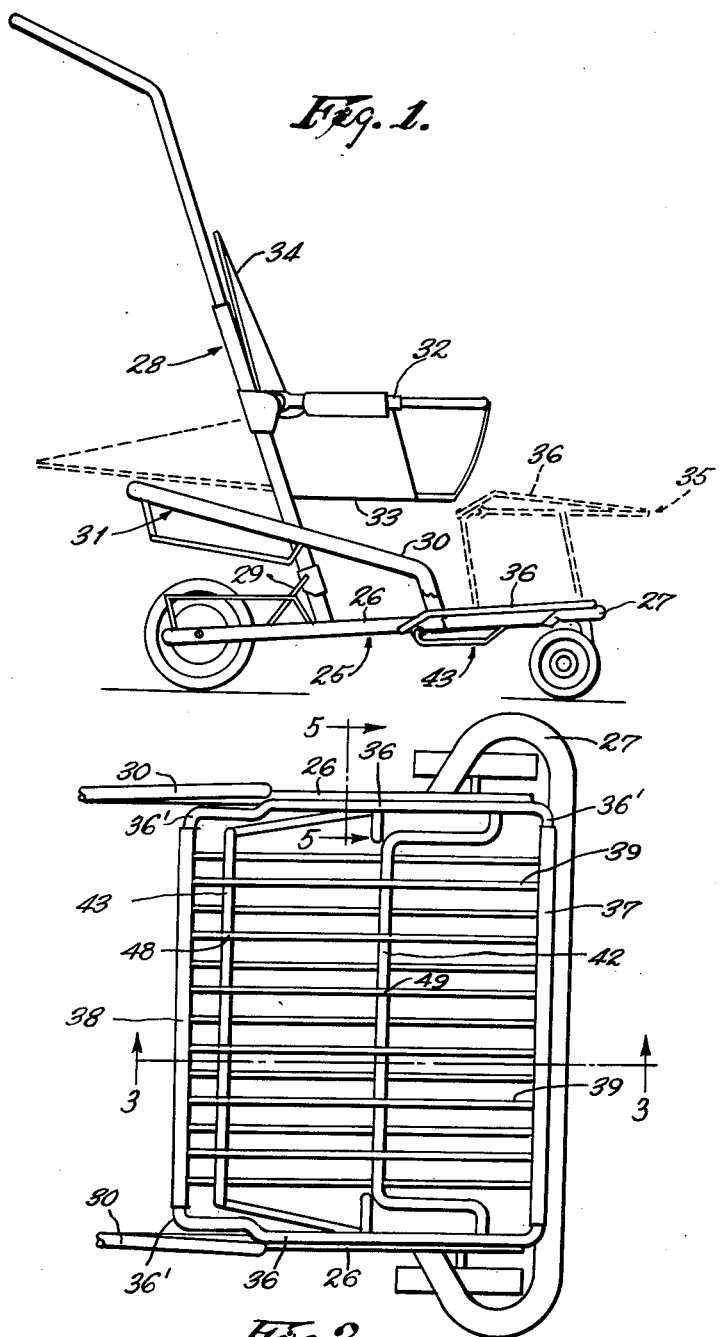
INVENTOR.
EARL F. HAMILTON,
BY
ATTORNEYS.

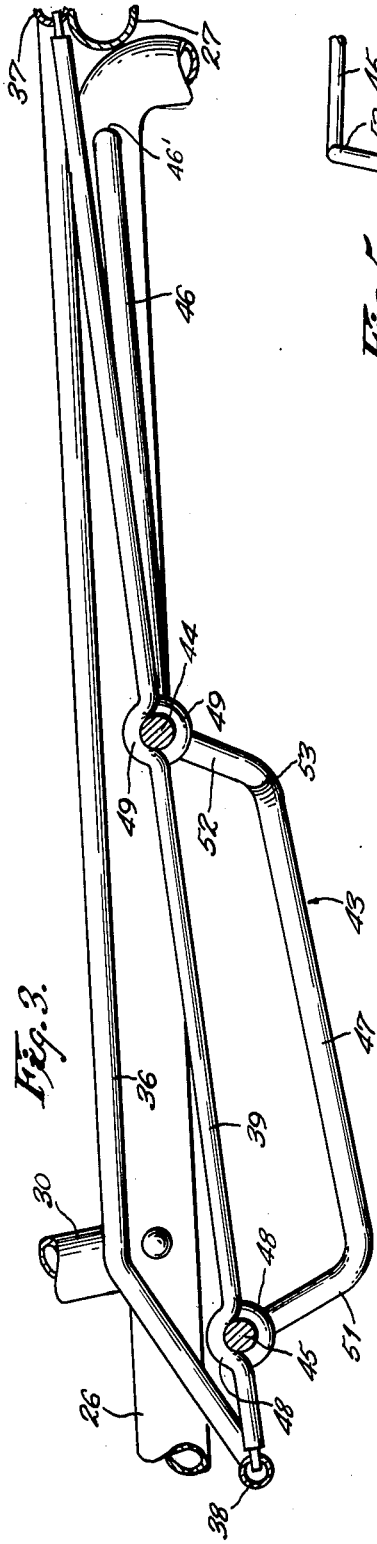

3,199,893
Patented Aug. 10, 1965

3,199,893
ADJUSTABLE FOOT REST FOR A STROLLER
Earl F. Hamilton, Columbus, Ind., assignor to Hamilton Cosco, Inc., Columbus, Ind., a corporation of Indiana
Original application Jan. 13, 1960, Ser. No. 2,201, now Patent No. 3,063,729, dated Nov. 13, 1962. Divided and this application Sept. 10, 1962, Ser. No. 222,278
8 Claims. (Cl. 280—47.4)

This invention relates to a baby stroller, especially a stroller of the type in which a back for the seat can be swung between upright and horizontal positions in the latter of which it serves as a rearward extension of the seat and permits the infant to recline. It has been proposed to provide such a stroller with a footrest which, when the back is lowered, can be elevated into a position generally coplanar with the seat to support the lower legs and feet of the reclining infant. This application, which is a division of my prior application Ser. No. 2,201 filed January 13, 1960, and now patent No. 3,063,729, is concerned with such a footrest.

A preferred form of footrest embodying the invention of this application comprises a grid of heavy wires movably supported from the base frame of the stroller through mechanism of the parallel-link type permitting movement of the footrest between a lower position, in which it may serve to support the feet of a sitting infant, and an upper position, in which it serves, in effect, as a forwardly projecting extension of the stroller seat. The aforesaid grid conveniently comprises a pair of side members having in-bent ends received in the ends of tubular front and rear members between which a series of parallel grid wires extend. The link mechanism may comprise front and rear U-shaped yokes having intermediate portions pivoted to the footrest grid on parallel, spaced axes and generally parallel arms provided with out-bent ends pivotally received in the base frame of the stroller. The pivotal connection of the intermediate yoke-portions to the grid is desirably effected by providing each grid wire with a pair of spaced, U-shaped offsets, the offsets on each pair of adjacent wires being located respectively above and beneath the intermediate link portions. The link mechanism is constructed, in a manner more fully described below, to hold the footrest positively, but releasable, in definitely determined upper and lower positions.

Other features of the invention will become apparent from the following more detailed description and from the accompanying drawings in which:

FIG. 1 is a side elevation of a stroller in which the footrest is shown in full lines in its lower position and in dotted lines in its upper position;

FIG. 2 is a fragmental plan view of the front end of the stroller showing the footrest in its lower position;

FIG. 3 is a vertical section on the line 3—3 of FIG. 2 showing, on an enlarged scale, the footrest in lower position;

FIG. 4 is a view similar to FIG. 3 showing the footrest elevated; and

FIG. 5 is a section on the line 5—5 of FIG. 2 showing the footrest elevated.

The particular stroller shown in the drawings is of the collapsible type described in detail in my aforesaid prior application. Since this application is not concerned with the stroller as a whole, only the more important features thereof will be mentioned herein.

As shown in FIG. 1, the stroller comprises a wheel-supported base frame 25 formed of metal tubing bent into a general U-shape to provide two parallel sides 26 the front ends of which are rigidly interconnected by a bumper 27. A handle 28 is connected to the base frame through a pair of links 29 and through the sides 30 of a basket frame 31. Carried by the handle 28 are arms 32 from which a seat 33 is supported. Pivotally associated with the seat is a back 34 which, by means not shown, can be held in either of the generally upright and generally horizontal positions shown respectively in full lines and dotted lines in FIG. 1. Releasable latch means (not shown) acting between the lower end of the handle and the base frame holds the handle in the erected position illustrated. By swinging the arms 32 upwardly and releasing the latch means, all as more fully described in my aforesaid prior application, the handle can be swung forwardly and the basket frame downwardly into positions close to and generally parallel to the base frame.

The footrest with which this application is concerned is designated in its entirety by the reference numeral 35. As shown, such footrest comprises side members 36, front and rear members 37 and 38, and a plurality of grid-forming wires 39 extending between the front and rear members. Conveniently, the front and rear members are formed of flat stock perforated for the reception of the ends of the grid wires and then rolled into a tubular cross-section. Each side member 36 comprises a metal rod having its ends 36' bent inwardly into parallel relation, received in the ends of the tubular front and rear members 37 and 38, and secured in any convenient manner against withdrawal therefrom.

The footrest 35 is adjustably supported from the base frame through the medium of front and rear U-shaped yokes 42 and 43. Such yokes have intermediate portions 44 and 45 respectively (FIGS. 3 and 4) rotatably connected to the footrest on spaced, transverse axes and generally parallel arms 46 and 47, the lower end 46' and 47' of which are bent outwardly to be rotatably received in holes in the sides 26 of the base frame 25. The rotatable connection of the intermediate portion of each yoke 42 or 43 to the footrest is conveniently effected by providing each of the grid wires 39 with a pair of spaced offsets 48 and 49 and by assembling the footrest so that the offsets on the several wires project alternately upwardly and downwardly to pass alternately over and under each intermediate yoke portion and locate it longitudinally of the footrest. As shown, the set of offsets 48 is located near the rear of the footrest to receive the rear yoke 43 and the other set 49 near the longitudinal middle to receive the front yoke.

The yokes 42 and 43 provide a general parallel-link connection between the footrest 35 and the base frame 25 enabling the footrest to be moved between the lower position, shown in FIG. 3 and in full lines in FIG. 1, and the upper position shown in FIG. 4 and in dotted lines in FIG. 1. Preferably, the sides 47 of the rear yoke 43 are offset downwardly (FIG. 3) to provide in each side a pair of portions 51 and 52, which extend generally perpendicularly to the plane containing the intermediate portion of the yoke and the out-bent ends. The portions 52, which lie adjacent the out-bent ends of the yoke, join the intermediate portions of the yoke-sides through bends 53 (FIG. 5), and the sides 47 of the yoke are so formed, that the distance $a$ over the bends 53 is somewhat greater than the space $b$ between the sides 26 of the base frame. As will be apparent from FIGS. 3 and 4, when the footrest is moved from its lower to its upper position, the bends 53 pass through the plane of the side members 26, which engage the bends 53 and force the yoke-sides 47 toward each other. As the footrest nears its upper position, the yoke-sides 47 spring back toward their normal positions and, by the engagement of the bends 53 with the upper inner surface portions of the frame-sides 31 (see FIG. 5), resiliently oppose rearward swinging of the yoke 43. Forward swinging of the yoke 43 under the influence of pressure from the frame sides on the bends 53 is limited by engagement of the yoke-portions 51 with the rear member 38 of the footrest, as shown in FIG. 4; and as a result, the footrest is held firmly in its elevated position.

Each footrest wire 39 is desirably initially formed with the straight portions on opposite sides of the offset 49 out of alignment with each other, as indicated by dotted lines in FIG. 4, to form an obtuse angle within which the offset 49 lies. When the footrest is assembled, the misaligned wire portions are forced into alignment causing the offsets 49 to bear resiliently against the intermediate leg 44 of the front yoke 42 and thereby creating substantial friction which opposes changes in the relative angular disposition of the footrest and the front yoke. When the footrest is moved from its upper position toward its lower position, such friction causes the imposition on the sides 47 of the rear yoke of forces which tend to shorten the effective length of those sides. Since such sides are not straight, they can yield resiliently to shorten their effective length. So long as the plane of the rear yoke 43 makes a substantial angle with the plane of the footrest, the side-shortening effect of friction at the offsets 49 is of little if any significance; but as the footrest near its lower position and the plane of the rear yoke approaches parallelism with the footrest, the force which the rear yoke must exert on the footrest to overcome such friction increases to a point such that the yoke-sides are incapable of sustaining it. In lowering of the footrest beyond this point, friction holds the footrest and front yoke in fixed angular relation to each other and the footrest and front yoke 42 act as a single rigid element forcing resilient shortening of the sides 47 of the rear yoke. The rear end of the footrest is made narrow enough, by offsetting the rear portions of the side members 36 inwardly, to permit it to pass downwardly between the sides 26 of the base frame 25, thus permitting the intermediate leg 45 of the rear yoke to pass through the common plane of the out-bent ends of both yokes. After such passage of the intermediate leg of the rear yoke through said common plane, the force exerted on the footrest by the resiliently stressed sides of the yoke tends to hold the front portions of the side members 36 of the footrest in firm contact with the base-frame sides 26 which they overlie, thus inhibiting rattling. The firm frictional grip of the offsets 49 on the intermediate leg 44 of the front yoke also inhibits rattling of the footrest when in its upper position.

The resilience of the sides of the rear yoke 43 can, if desired, be utilized in a somewhat different way to hold the sides 36 of the footrest in firm, non-rattling contact with the base frame when the footrest is in lowered position. Thus, if the effective length of the sides of the front yoke 42 is made slightly greater than the effective length of the rear-yoke sides, or if the distance between the offsets 48 and 49 is made slightly greater than that between the holes on the frame-sides 26 which receive the out-bent ends of the two yokes, the intermediate portion 45 of the rear yoke will, as the footrest is lowered, reach the plane of the frame-sides while the intermediate portion of the front yoke 42 is above that plane. If the footrest is forced further downwardly until the footrest sides 36 engage the base frame, the sides of the rear yoke 43 will be elastically extended and the force they exert on the footrest will urge it downwardly and force its sides 36 into firm contact with the sides 26 of the base frame.

Desirably, as will be clear from FIGS. 2 and 3, the length of the footrest 35 is such that, when lowered, it extends from a point approximately directly below the front edge of the seat 33 to the bumper 27 upon which the front footrest member 37 may rest to provide for the footrest support supplementing that provided by engagement of the footrest sides 36 with the sides 36 of the base frame. The yoke-sides 46 and 47 have lengths such that the footrest, when raised to its upper position, will be disposed approximately coplanar with, or slightly lower than, the seat 33 so that it may serve to support the lower legs of a reclining infant.

I claim as my invention:

1. In a stroller having a wheel-supported base frame including two generally parallel sides, a seat supported above said base frame, a footrest, and two yokes interconnecting said footrest and base frame, each of said yokes comprising a metal rod of circular cross-section bent into a general U-shape to provide an intermediate leg and two parallel sides, the intermediate legs of said yokes being pivotally connected to said footrest on spaced parallel axes, and the ends of the sides of each yoke being bent outwardly into coaxial relation and rotatably received in holes in the sides of the base frame, the sides of one of said yokes having outward offsets the distance over which is greater than the space between the sides of the base frame, said yokes being swingable about the respective axes of their outwardly bent ends to permit movement of the footrest between upper and lower positions, said offsets being so located that as the footrest nears upper position the offsets pass through and beyond the plane of the base-frame sides to engage such sides resiliently above their horizontal diameters and releasably hold the footrest in its upper position.

2. A stroller as set forth in claim 1 with the addition that said footrest includes a rear cross member, the rearmost of said yokes being formed to engage said cross member as the footrest reaches its upper position.

3. In a stroller having a wheel-supported base frame including two generally parallel sides, a seat supported above said base frame, a footrest, and two yokes interconnecting said footrest and base frame, each of said yokes comprising a metal rod of circular cross-section bent into a general U-shape to provide an intermediate leg and two parallel sides, the intermediate legs of said yokes being pivotally connected to said footrest on a first pair of spaced parallel axes, and the ends of the sides of each yoke being bent outwardly into coaxial relation and rotatably received in holes on a second pair of spaced parallel axes in the sides of the base frame, said yokes being swingable about the respective axes of their outwardly bent ends to permit movement of the footrest between upper and lower positions, the distance between the two axes of each pair of axes and the effective lengths of the yoke-sides being such that as the intermediate portions and out-bent ends of the yokes approach coplanar relationship in movement of the footrest into lower position stresses develop in the yoke-sides tending to change their effective lengths, the sides of one of said yokes having intermediate offsets providing sufficient resilience to permit the effective lengths of such sides to vary and the footrest to be forced into its lower position.

4. A stroller as set forth in claim 1 with the addition that said footrest comprises front and rear cross members, side members, and a series of parallel grid wires extending between said cross members, each of said cross members being tubular and provided along its length with apertures receiving the ends of the grid wires, said side members being provided with in-bent ends received in the ends of the cross members.

5. A stroller as set forth in claim 3 with the addition that said footrest comprises front and rear cross members, side members, and a series of parallel grid wires extending between said cross members, each of said cross members being tubular and provided along its length with apertures receiving the ends of the grid wires, said side members being provided with in-bent ends received in the ends of the cross members.

6. In a stroller having a base frame and a seat, a footrest comprising front and rear cross members and a series of grid wires extending between said cross members, means adjustably supporting said footrest from the base frame, said means comprising a pair of U-shaped yokes each having an intermediate leg pivotally connected to the footrest and two sides pivotally connected at their ends to the base frame, said grid wires being provided intermediate their lengths with generally semicircular offsets aligned transversely of the footrest, the offsets of adjacent grid wires being oppositely disposed to be respectively above and below and to receive the intermediate yoke-legs and being of such a curvature that they closely embrace such intermediate yoke-legs, the sides of one of said yokes having outward offsets spaced apart a distance greater than the width of the base frame, said yokes being swingable about their connection to the base frame to permit movement of the footrest between upper and lower positions, and said offsets on the sides of said one yoke being so located that as the footrest nears upper position the offsets on said one yoke pass through and beyond the plane of the base frame sides to engage such side resiliently above their horizontal diameters and releasably hold the footrest in its upper position.

7. In a stroller having a base frame and a seat, a footrest comprising front and rear cross members and a series of grid wires extending between said cross members, means adjustably supporting said footrest from the base frame, said means including a U-shaped yoke having an intermediate leg pivotally connected to the footrest and two sides pivotally connected at their ends to the base frame, said grid wires being provided intermediate their lengths with generally semicircular offsets aligned transversely of the footrest, the offsets of adjacent grid wires being oppositely disposed to be respectively above and below and to receive the intermediate yoke-leg and being of such curvature that they closely embrace such intermediate yoke-legs, each grid wire being resilient and, as formed, including two portions lying on opposite sides of the offset and disposed at an obtuse angle relative to each other with the offset lying within such angle, said cross members, when assembled with the grid wires and yoke, holding the two portions of each wire in approximate alignment and thereby causing the offsets to be resiliently forced into firm frictional engagement with the intermediate yoke-leg.

8. In a stroller having a base frame and a seat, a footrest comprising front and rear cross members and a series of grid wires extending between said cross members, means adjustably supporting said footrest from the base frame, said means including a U-shaped yoke having an intermediate leg pivotally connected to the footrest and two sides pivotally connected at their ends to the base frame, said grid wires being provided intermediate their lengths with generally semicircular offsets aligned transversely of the footrest, the offsets of adjacent grid wires being oppositely disposed to be respectively above and below and to receive the intermediate yoke-leg and being of such curvature that they closely embrace such intermediate yoke-legs, said grid wires being resilient and so formed that when assembled with the cross members and yoke they are resiliently stressed in flexure and thereby held in firm frictional engagement with the intermediate yoke-leg.

References Cited by the Examiner
UNITED STATES PATENTS

| | | | |
|---|---|---|---|
| 2,174,870 | 10/39 | Daniels | 280—29 X |
| 2,602,675 | 7/52 | Forman | 280—36 |
| 2,782,047 | 2/57 | Moran | 280—36 |
| 2,798,730 | 7/57 | Smith | 280—47.4 X |
| 2,823,043 | 2/58 | Shone | 280—36 |
| 2,886,337 | 5/59 | Quisenberry | 280—36 |
| 3,010,731 | 11/61 | Kenny | 280—36 |

A. HARRY LEVY, *Primary Examiner.*

PHILIP ARNOLD, *Examiner.*